(12) United States Patent
Kim et al.

(10) Patent No.: US 8,962,506 B2
(45) Date of Patent: Feb. 24, 2015

(54) DIELECTRIC COMPOSITION AND MULTILAYER CERAMIC ELECTRONIC COMPONENT INCLUDING THE SAME

(71) Applicant: Samsung Electro-Mechanics Co., Ltd., Suwon, Gyunggi-do (KR)

(72) Inventors: Kyu Ree Kim, Gyunggi-do (KR); Seok Hyun Yoon, Gyunggi-do (KR); Sun Ho Yoon, Gyunggi-do (KR); Chang Hoon Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/842,332

(22) Filed: Mar. 15, 2013

(65) Prior Publication Data

US 2013/0250478 A1 Sep. 26, 2013

(30) Foreign Application Priority Data

Mar. 20, 2012 (KR) .................. 10-2012-0028212

(51) Int. Cl.
*C04B 35/468* (2006.01)
*H01G 4/10* (2006.01)
(Continued)

(52) U.S. Cl.
CPC .............. *C04B 35/468* (2013.01); *H01G 4/008* (2013.01); *C04B 35/4682* (2013.01); *H01G 4/30* (2013.01); *H01G 4/1227* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3229* (2013.01); *C04B 2235/3236* (2013.01); *C04B 2235/3239* (2013.01);
(Continued)

(58) Field of Classification Search
CPC .............. C04B 35/468; C04B 35/4682; C04B 2235/3236; C04B 2235/3239; C04B 2235/79; H01G 4/1227; H01G 4/30; H01G 4/008
USPC ................................ 501/138, 139; 361/321.4
See application file for complete search history.

(56) References Cited

U.S. PATENT DOCUMENTS 4,535,064 A * 8/1985 Yoneda ......................... 501/138
7,521,390 B2 * 4/2009 Symes et al. .................. 501/138
(Continued)

FOREIGN PATENT DOCUMENTS

JP 2008-230928 A 10/2008
KR 10-2008-0048458 A 6/2008

*Primary Examiner* — Karl Group
(74) *Attorney, Agent, or Firm* — McDermott Will & Emery LLP

(57) ABSTRACT

There is provided a dielectric composition, including: a base powder including $Ba_mTiO_3$, where $0.995 \le m \le 1.010$; a first subcomponent including 0.1 to 1.0 at % (x) of an oxide or carbonate containing at least one variable-valence acceptor element based on 100 moles of the base powder; a second subcomponent including 0.01 to 3.0 at % (y) of an oxide or carbonate containing at least one fixed valence acceptor element; a third subcomponent including an oxide or carbonate containing cerium (z) at % and at least one other rare-earth element (w) at %, where $0.01 \le z \le x+4y$ and $0.01 \le z+w \le x+4y$; a fourth subcomponent including at least one of an oxide or carbonate containing at least one of Barium, Calcium, Aluminum, and Silicon and glass containing silicon; and a fifth subcomponent including 0.01 to 10.0 at % of an oxide containing zirconium.

16 Claims, 1 Drawing Sheet

(51) Int. Cl.
*H01G 4/008* (2006.01)
*H01G 4/30* (2006.01)
*H01G 4/12* (2006.01)

(52) U.S. Cl.
CPC ............... *C04B 2235/3241* (2013.01); *C04B 2235/3244* (2013.01); *C04B 2235/3262* (2013.01); *C04B 2235/3267* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/36* (2013.01); *C04B 2235/442* (2013.01); *C04B 2235/5445* (2013.01); *C04B 2235/652* (2013.01); *C04B 2235/6582* (2013.01); *C04B 2235/663* (2013.01); *C04B 2235/79* (2013.01)
USPC .................. 501/138; 501/139; 361/321.4

(56) References Cited

U.S. PATENT DOCUMENTS

| | | |
|---|---|---|
| 7,911,764 B2 * | 3/2011 | Sasabayashi et al. ...... 361/321.4 |
| 2009/0219666 A1 | 9/2009 | Fukuda |
| 2013/0083449 A1 * | 4/2013 | Yoon et al. ................. 361/321.4 |
| 2013/0083450 A1 * | 4/2013 | Yoon et al. ................. 361/321.4 |

* cited by examiner

A-A`

DIELECTRIC COMPOSITION AND MULTILAYER CERAMIC ELECTRONIC COMPONENT INCLUDING THE SAME

CROSS-REFERENCE TO RELATED APPLICATIONS

This application claims the priority of Korean Patent Application No. 10-2012-0028212 filed on Mar. 20, 2012, in the Korean Intellectual Property Office, the disclosure of which is incorporated herein by reference.

BACKGROUND OF THE INVENTION

1. Field of the Invention

The present invention relates to a dielectric composition and a multilayer ceramic electronic component including the same.

2. Description of the Related Art

Examples of electronic components using a ceramic material include a capacitor, an inductor, a piezoelectric element, a varistor, a thermistor and the like.

Among these ceramic electronic components, a multilayer ceramic capacitor (MLCC) has a small size, secures high capacitance, and is easily mountable.

A multilayer ceramic capacitor is a chip type condenser that is mounted on circuit boards of several electronic products, for example, an image display device, such as a liquid crystal display (LCD), a plasma display panel (PDP), or the like, a computer, a personal digital assistant (PDA), a cellular phone, and the like, to thereby store or discharge an electric charge.

Heat generated by electronic devices is a growing problem, since the average size of image display devices has recently been enlarged, while the rates of central processing units (CPUs) included in computers have also increased.

Therefore, a multilayer ceramic capacitor is required to secure stable capacitance and reliability, even at high temperatures, to allow for the stable operation of integrated circuits (ICs) installed in electronic devices.

In addition, multilayer ceramic capacitors have various sizes and lamination amounts, depending on the usage and intended capacitance thereof.

In particular, in order to meet recent requirements for electronic products, such as the miniaturization, lightening, and multi-functionalization thereof, multilayer ceramic capacitors used in electronic products have also been required to have an ultra-small size and an ultrahigh capacitance and be able to boost voltages.

For this reason, a multilayer ceramic capacitor, in which dielectric layers and internal electrode layers are thinly formed to allow a product to have an ultra-small size and in which a large number of dielectric layers are laminated to allow for an ultrahigh capacitance, has been manufactured.

However, when the multilayer ceramic capacitor is manufactured as above, in the case in which the dielectric layer is thinned and voltage is boosted, the strength of an electric field across the dielectric layers may be increased due to the boosting of voltage, which may degrade DC-bias characteristics and reliability.

Furthermore, the formation of thin layers may cause defects in layer microstructure, to thereby degrade high-temperature withstand voltage characteristics, such as breakdown voltage (BDV), insulation resistance (IR), and the like.

In order to prevent these problems, a method of finely-grinding a base powder may be considered. However, as particles of the base powder are reduced in size, the user-desired amount and temperature characteristics may be difficult to implement and the dielectric constant may be decreased.

Patent Document 1 is different from embodiments of the present invention in terms of respective subcomponents and contents thereof, and has a dielectric ceramic composition with low dielectric constant characteristics.

PRIOR ART DOCUMENT (Patent Document 1) Japanese Patent Laid-Open Publication No. 2008-230928

SUMMARY OF THE INVENTION

An aspect of the present invention provides a dielectric composition capable of realizing high dielectric constant characteristics and excellent high-temperature withstand voltage characteristics while dielectric layers are not thinned, and thus securing reliability, and a multilayer ceramic electronic component including the same.

According to an aspect of the present invention, there is provided a dielectric composition, including: a base powder including $Ba_mTiO_3$, where $0.995 \leq m \leq 1.010$; a first subcomponent including 0.1 to 1.0 at % (x) of an oxide or carbonate containing at least one variable-valence acceptor element based on 100 moles of the base powder; a second subcomponent including 0.01 to 3.0 at % (y) of an oxide or carbonate containing at least one fixed valence acceptor element based on 100 moles of the base powder; a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$; a fourth subcomponent including at least one of an oxide or carbonate containing at least one of Barium, Calcium, Aluminum and Silicon and glass containing silicon; and a fifth subcomponent including 0.01 to 10.0 at % of an oxide containing zirconium based on 100 moles of the base powder.

The fourth subcomponent may be contained in an amount of 0.1 to 8.0 moles based on 100 moles of the base powder.

According to another aspect of the present invention, there is provided a dielectric composition, including: a base powder including $Ba_mTiO_3$, where $0.995 \leq m \leq 1.010$; a first subcomponent including 0.1 to 1.0 at % (x) of an oxide or carbonate containing at least one variable-valence acceptor element based on 100 moles of the base powder; a second subcomponent including an oxide or carbonate containing at least one fixed valence acceptor element; a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$; a fourth subcomponent including 0.1 to 8.0 moles of at least one of an oxide or carbonate containing at least one of Barium, Calcium, Aluminum and Silicon and glass containing silicon based on 100 moles of the base powder; and a fifth subcomponent including 0.01 to 10.0 at % of an oxide containing zirconium based on 100 moles of the base powder.

The second subcomponent may be contained in an amount of 0.01 to 3.0 at % based on 100 moles of the base powder.

The variable-valence acceptor element of the first subcomponent may be selected from the group consisting of manganese (Mn), vanadium (V), chrome (Cr), iron (Fe), nickel (Ni), cobalt (Co), copper (Cu), and zinc (Zn).

The fixed valence acceptor element of the second subcomponent may be selected from the group consisting of magnesium (Mg) and aluminum (Al).

The rare-earth element of the third subcomponent may be selected from the group consisting of yttrium (Y), dysprosium (Dy), holmium (Ho), erbium (Er) and gadolinium (Gd), Nd (Neodynium), Sm (Samarium) and Yb (Ytterbium).

The transition metal of the fourth subcomponent may be selected from the group consisting of silicon (Si), barium (Ba), calcium (Ca), and aluminum (Al).

According to another aspect of the present invention, there is provided a multilayer ceramic electronic component, including: a ceramic sintered body having a plurality of dielectric layers laminated therein; a plurality of internal electrodes formed within the ceramic sintered body; and at least one pair of external electrodes provided on external end surfaces of the ceramic sintered body and electrically connected to the internal electrodes, wherein the dielectric layers include: a base powder including $Ba_mTiO_3$, where $0.995 \leq m \leq 1.010$; a first subcomponent including 0.1 to 1.0 at % (x) of an oxide or carbonate containing at least one variable-valence acceptor element based on 100 moles of the base powder; a second subcomponent including 0.01 to 3.0 at % (y) of an oxide or carbonate containing at least one fixed valence acceptor element based on 100 moles of the base powder; a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$; a fourth subcomponent including at least one of an oxide or carbonate containing at least one of Barium, Calcium, Aluminum and Silicon and glass containing silicon; and a fifth subcomponent including 0.01 to 10.0 at % of an oxide containing zirconium based on 100 moles of the base powder.

According to another aspect of the present invention, there is provided a multilayer ceramic electronic component, including: a ceramic sintered body having a plurality of dielectric layers laminated therein; a plurality of internal electrodes formed within the ceramic sintered body; and at least one pair of external electrodes provided on external end surfaces of the ceramic sintered body and electrically connected to the internal electrodes, wherein the dielectric layers include: a base powder including $Ba_mTiO_3$, where $0.995 \leq m \leq 1.010$; a first subcomponent including 0.1 to 1.0 at % (x) of an oxide or carbonate containing at least one variable-valence acceptor element based on 100 moles of the base powder; a second subcomponent including an oxide or carbonate containing at least one fixed valence acceptor element; a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$; a fourth subcomponent including 0.1 to 8.0 moles of at least one of an oxide or carbonate containing at least one of Barium, Calcium, Aluminum and Silicon and glass containing silicon based on 100 moles of the base powder; and a fifth subcomponent including 0.01 to 10.0 at % of an oxide containing zirconium based on 100 moles of the base powder.

The dielectric layers each may have a thickness of 0.1 to 10.0 μm.

The internal electrodes may include nickel (Ni) or a nickel (Ni) alloy.

The internal electrodes and the dielectric layers may be alternately laminated.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
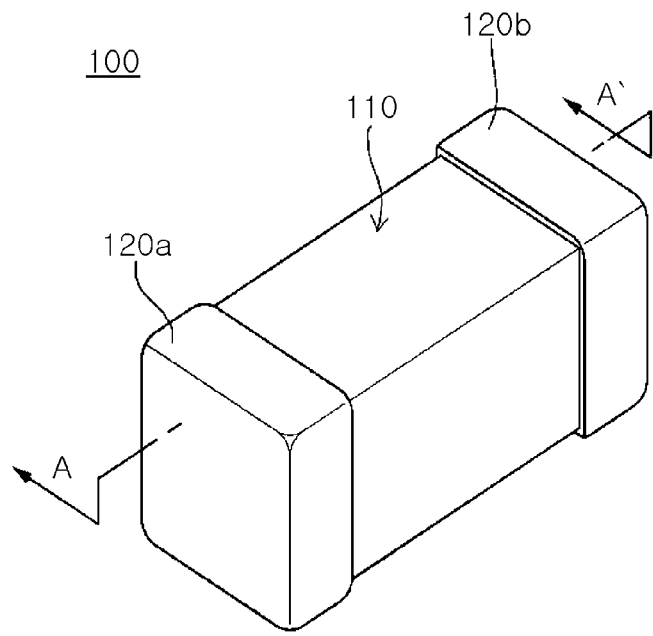
FIG. 1 is a perspective view schematically showing a multilayer ceramic capacitor according to an embodiment of the present invention.

Hereinafter, embodiments of the present invention will be described in detail with reference to the accompanying drawings.

However, the invention may be embodied in many different forms and should not be construed as being limited to the embodiments set forth herein.

The embodiments of the present invention are provided so that those skilled in the art may more completely understand the present invention.

In the drawings, the shapes and dimensions of components may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present invention is directed to a dielectric composition, and a ceramic electronic component including the dielectric composition according to an embodiment of the present invention may be a multilayer ceramic capacitor, an inductor, a piezoelectric element, a varistor, a chip resistor, a thermistor, or the like. A multilayer ceramic capacitor will be described as an example of a ceramic electronic component as follows.

Figure 2:
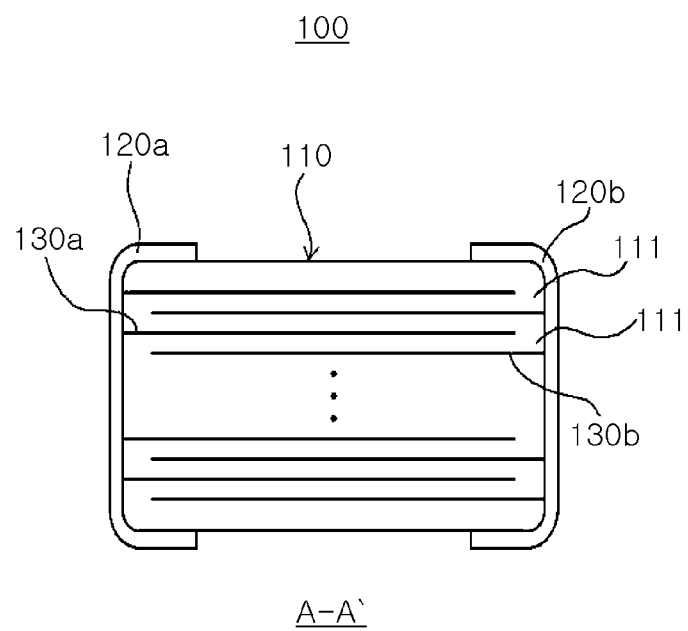
FIG. 2 is a cross-sectional view taken along line A-A' of FIG. 1.

Referring to FIGS. 1 and 2, a multilayer ceramic capacitor 100 according to an embodiment of the present invention may include a ceramic sintered body 110 in which a plurality of dielectric layers 111 and a plurality of first and second internal electrodes 130a and 130b are alternately laminated.

First and second external electrodes 120a and 120b may be formed at two end portions of the ceramic sintered body 110 while being electrically connected to the first and second internal electrodes 130a and 130b alternately disposed within the ceramic sintered body 110.

The shape of the ceramic sintered body 110 is not particularly limited, but the ceramic sintered body 110 may have a rectangular parallelepiped shape.

In addition, the dimensions of the ceramic sintered body 110 are not particularly limited, but the ceramic sintered body 110 may have appropriate dimensions depending on the intended usage thereof.

The thickness of the dielectric layer 111 may be arbitrarily changed depending on desired capacitance of the multilayer ceramic capacitor. Here, in the case in which the dielectric layer 111 is excessively thin, the number of crystalline grains present in a single dielectric layer is low, which may have a negative influence on the reliability of the dielectric layer 111.

Therefore, in the present embodiment, the thickness of the dielectric layer 111 after sintering is set to 0.1 μm or more per layer.

Here, the thickness of the dielectric layer 111 may be set to be in a range from 0.1 to 10.0 μm, and the present invention is not limited thereto.

The first and second internal electrodes 130a and 130b may be laminated such that cross sections thereof are alternately exposed through opposing end surfaces of the ceramic sintered body 110.

Here, a conductive material contained in the first and second internal electrodes 130a and 130b is not particularly limited. However, since a constituent material of the dielectric layer 111 needs to have resistance to reduction, base metals may be used for the first and second internal electrodes 130a and 130b.

As the base metal, nickel (Ni) or a nickel (Ni) alloy may be used.

Also, the element used in the nickel (Ni) alloy may be at least one selected from manganese (Mn), chromium (Cr), cobalt (Co), and aluminum (Al).

The first and second external electrodes 120a and 120b may enclose the two end surfaces of the ceramic sintered body 110. They may be electrically connected to the exposed ends of the first and second internal electrodes 130a and 130b, which are alternately exposed through the two end surfaces of the ceramic sintered body 110, to thereby constitute a capacitor circuit.

A conductive material contained in the first and second external electrodes 120a and 120b is not particularly limited, but Ni, Cu, or alloys thereof, having excellent electric conductivity, may be used.

The dielectric layers 111 constituting this ceramic sintered body 110 may contain a dielectric composition having resistance to reduction.

The dielectric composition according to the present embodiment of the invention may include: a base powder including $Ba_mTiO_3$ ($0.995 \leq m \leq 1.010$); a first subcomponent including 0.1 to 1.0 at % (x) of an oxide or carbonate containing at least one variable-valence acceptor element based on 100 moles of the base powder; a second subcomponent including 0.01 to 3.0 at % (y) of an oxide or carbonate containing at least one fixed valence acceptor element based on 100 moles of the base powder; a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$; a fourth subcomponent including at least one of an oxide or carbonate containing at least one of Barium, Calcium, Aluminum and Silicon and glass containing silicon; and a fifth subcomponent including 0.01 to 10.0 at % of an oxide or carbonate containing zirconium based on 100 moles of the base powder.

The fourth subcomponent may be contained in an amount of 0.1 to 0.8 moles based on 100 moles of the base powder.

Here, the contents (at %) of the first to fifth subcomponents are represented by atomic moles exemplified below.

Here, atomic moles may refer to mole % of each element even in the case that the element is introduced in any of an oxide state or ionic state. For example, in the case in which a Y oxide is $Y_2O_3$, its content may be calculated on the basis of the content of $Y^{+3}$ in moles.

The above-described dielectric composition has a high dielectric constant of 4000 or higher at room temperature and 0.5 V/μm, while retaining high-temperature voltage resistance characteristics, that is, high-temperature accelerated lifespan substantially equal to that of an existing dielectric composition, to thereby achieve high capacitance.

In addition, the dielectric composition may be fired at a reducing atmosphere of about 1260° C. or lower, and thus internal electrodes containing nickel (Ni) or a nickel (Ni) alloy may be used at the time of manufacturing of an ceramic electronic component.

Hereinafter, respective components of the dielectric composition according to an embodiment of the present invention will be described in detail.

a) Base Powder

A base powder is a main component of a dielectric composition, and a $Ba_mTiO_3$ ($0.995 \leq m \leq 1.010$) based dielectric powder may be used as the base powder. In addition, the base powder may have a particle size of 1.0 μm or smaller Here, when m is less than 0.995, the base powder may be easily deoxidized (reduced) into a semi-conductive substance during firing under a reduction atmosphere. On the other hand, when m exceeds 1.010, a firing temperature may be excessively high.

b) First Subcomponent

The first subcomponent may include an oxide or carbonate containing at least one variable-valence acceptor element.

The oxide or carbonate containing at least one variable-valence acceptor element may function to improve resistance to reduction and reliability.

The variable-valence acceptor element may be selected from the group consisting of manganese (Mn), vanadium (V), chrome (Cr), iron (Fe), nickel (Ni), cobalt (Co), copper (Cu), and zinc (Zn), and the variable-valence acceptor element is not limited thereto.

In addition, the form of the oxide or carbonate is not particularly limited, and for example, manganese oxide ($MnO_2$), manganese carbonate ($MnCO_3$), or the like may be used.

Here, the content of the first subcomponent may be 0.1 to 1.0 at % based on 100 moles of the base powder.

When the content of the first subcomponent is less than 0.1 at %, high-temperature withstand voltage characteristics may be deteriorated. When the content of the first subcomponent exceeds 1.0 at %, an aging rate may be increased, a dielectric constant may be lowered, and high-temperature withstand voltage characteristics may be deteriorated.

c) Second Subcomponent

The second subcomponent may include an oxide or carbonate containing at least one fixed valence acceptor element.

The oxide or carbonate containing at least one fixed valence acceptor element may function to suppress abnormal grain growth by controlling the micro-structure of the dielectric composition, and thus, impart sintering stability to the dielectric composition.

The fixed valence acceptor element may be selected from the group consisting of, for example, magnesium (Mg) and aluminum (Al), but the fixed valence acceptor element is not limited thereto.

In addition, the form of the oxide or carbonate is not particularly limited, and for example, magnesium oxide (MgO), magnesium carbonate ($MgCO_3$), or the like may be used.

Here, the content of the second subcomponent may be 0.01 to 3 at % based on 100 moles of the base powder.

When the content of the second subcomponent exceeds 3.0 at %, a sintering temperature may increase excessively, and thus, high-temperature withstand voltage characteristics may be deteriorated.

d) Third Subcomponent

The third subcomponent may include an oxide or carbonate containing at least one rare earth element. Here, cerium (Ce), among the rare earth elements, may be contained as an indispensable component.

That is, the third subcomponent may further include, based on cerium (Ce), other rare-earth elements that may be combined with cerium (Ce).

The rare earth element improves high-temperature accelerated lifespan and stabilizes a capacitance change at a phase transition temperature (Tc) thereof or higher, to thereby improve reliability. Thus, it may function to secure desired temperature characteristics to thereby increase a dielectric constant.

The rare earth element may be selected from the group consisting of yttrium (Y), dysprosium (Dy), holmium (Ho), erbium (Er) and gadolinium (Gd), Nd (Neodynium), Sm (Samarium), and Yb (Ytterbium), but the rare earth element is not limited thereto.

In addition, the form of the oxide or carbonate containing the rare earth element is not particularly limited.

Here, the content of the third subcomponent capable of improving the reliability of the dielectric composition, based on 100 moles of the base powder, may be $0.01 \leq z \leq x+4y$ and $0.01 \leq z+w \leq x+4y$, when the content of the first subcomponent is x at %, the second subcomponent is y at %, the content of cerium (Ce) is z at %, and the content of other rare earth elements is w at %.

When the content z of cerium (Ce) is outside of the above range, resistance to reduction may be deteriorated. In the case of a dielectric composition co-doped with the second subcomponent and the third subcomponent within the above ranges, the reliability thereof can be further improved as compared with the dielectric composition containing only the first subcomponent.

Meanwhile, as another embodiment of the invention, when the content of the second subcomponent is not defined or the second subcomponent is not contained in the dielectric composition, the third subcomponent may include an oxide or carbonate containing cerium (Ce) z at % and at least one other rare-earth element w at %, and here, the range of the third subcomponent may satisfy $0.01 \leq z+w \leq 4x$.

e) Fourth Subcomponent

The fourth subcomponent functions as a sintering agent, and may include at least one of an oxide or carbonate containing at least one transition metal and glass containing silicon (Si).

The oxide or carbonate containing Barium, Calcium, Aluminum, and Silicon may function to decrease a sintering temperature and promote sintering.

The fourth subcomponent may be selected from the group consisting of silicon (Si), barium (Ba), calcium (Ca), and aluminum (Al), but the transition metal is not limited thereto.

In addition, the form of the oxide or carbonate containing Barium, Calcium, Aluminum, and Silicon is not particularly limited.

Here, the content of the fourth subcomponent may be 0.1 to 8.0 mole based on 100 moles of the base powder.

When the content of the fourth subcomponent is less than 0.1 mole or exceeds 8.0 moles, sinterability may be deteriorated.

f) Fifth Subcomponent

The fifth subcomponent may include an oxide containing zirconium (Zr), and may function to increase a dielectric constant.

The form of the oxide containing zirconium (Zr) is not particularly limited, and for example, a zirconium oxide ($ZrO_2$) or the like may be used.

Here, the content of the fifth subcomponent may be 0.01 to 10.0 at % based on 100 moles of the base powder.

When the content of the fourth subcomponent exceeds 10.0 at %, cold crystallization temperature (TCC) characteristics may be deteriorated.

Hereinafter, embodiments of the present invention will be described in detail with reference to Inventive Examples and Comparative Examples. However, these embodiments are provided to convey the scope of the invention to those skilled in the art and, the scope of the present invention is not limited to Inventive Examples below.

INVENTIVE EXAMPLE

Ethanol and toluene, which are solvents, a dispersant, and a binder were mixed with a raw material powder containing a base powder as a main component and first to fifth subcomponents.

$BaTiO_3$ having an average particle size of 170 nm was used as the base powder.

Then, the mixture was subjected to ball milling for about 20 hours to thereby produce a slurry. Here, zirconia balls were used as a mix/dispersion medium.

Then, the slurry was formed as ceramic sheets having a thickness of 3.5 μm and a thickness of 10 to 13 μm by using a small doctor blade type coater.

Then, nickel (Ni) internal electrodes were printed on the ceramic sheets, respectively, to thereby manufacture active sheets.

Then, the 21 active sheets having the internal electrodes printed thereon were laminated and pressed, and top and bottom covers were prepared by laminating 25 cover sheets, each of which has a thickness of 10 to 13 μm, thereby forming a bar.

Then, the bar was cut into chips using a cutter and each chip had a size of 3.2 mm×1.6 mm.

The cut chip was subjected to plasticizing for debindering and firing at a temperature of about 1150 to 1250° C. under a reducing atmosphere of hydrogen (H2, 0.1%)/nitrogen (N2, 99.9%) for about 2 hours, followed by a heat treatment for re-oxidation at a temperature of about 1000° C. under a nitrogen atmosphere for about 3 hours.

Then, the fired chip was subjected to a termination process using a copper (Cu) paste and an electrode firing process, to thereby form external electrodes.

Therefore, a MLCC chip of 3.2 mm×1.6 mm was manufactured. Then, the manufactured MLCC chip was evaluated with respect to dissipation factor (DF), TCC, and a resistance degradation behavior depending on a increase in voltage step at a high temperature of 150° C.

[Evaluation]

Room-temperature capacitance and dielectric loss of the multilayer ceramic capacitor were measured by using an LCR meter under the conditions of 1 kHz and 1V.

Then, the dielectric constant of the multilayer ceramic capacitor was calculated from the measured capacitance, the thickness of the dielectric layer of the MLCC chip, the area of the internal electrode, and the number of laminated dielectric layers.

10 samples were selected, and DC 10 V/μm was applied thereto for 60 seconds, and then the room-temperature insulation resistance of each sample was measured.

Then, the resistance degradation behavior was measured by conducting a high-temperature insulation resistance (IR) boosting experiment under the conditions of 150° C. and 1 Vr=10V/μm while the voltage step is continuously increased at a rate of DC 10V/μm, and here, each step of voltage application required 10 minutes and the resistance was measured at 5 second intervals.

The high-temperature withstand voltage was deduced from the high-temperature insulation resistance (IR) boosting experiment.

The high-temperature withstand voltage means a voltage at which the insulation resistance (IR) withstands $10^5\Omega$ or higher in the high-temperature insulation resistance (IR) boosting experiment.

An RC value may be obtained by multiplying the room-temperature capacitance value measured at AC 0.5V/μm and 1 kHz by the insulation resistance value measured at DC 10V/μm.

Table 1 below shows the compositional ratio of respective subcomponents in X5R or X7R type dielectric compositions, and Table 2 shows characteristics of proto-type chips manufactured by the dielectric compositions having the compositional ratios listed in Table 1.

TABLE 1

Number of Moles of Each Additive Element Based on 100 Moles of Base Powder $BaTiO_3$

| Samples | First Subcomponent | | Second Subcomponent | Third Subcomponent | | Fourth Subcomponent | | |
|---|---|---|---|---|---|---|---|---|
| | $MnO_2$ | $V_2O_5$ | $MgCO_3$ | $Dy_2O_3$ | $CeO_2$ | $BaCO_3$ | $Al_2O_3$ | $SiO_2$ |
| 1 | 0.10 | 0.10 | 1.00 | 0.50 | 0.00 | 1.20 | 0.20 | 1.25 |
| 2 | 0.10 | 0.10 | 1.00 | 0.40 | 0.20 | 1.20 | 0.20 | 1.25 |
| 3 | 0.10 | 0.10 | 1.00 | 0.30 | 0.40 | 1.20 | 0.20 | 1.25 |
| 4 | 0.10 | 0.10 | 1.00 | 0.20 | 0.60 | 1.20 | 0.20 | 1.25 |
| 5 | 0.10 | 0.10 | 1.00 | 0.10 | 0.80 | 1.20 | 0.20 | 1.25 |
| 6 | 0.10 | 0.10 | 1.00 | 0.00 | 1.00 | 1.20 | 0.20 | 1.25 |
| 7 | 0.10 | 0.10 | 1.00 | 0.00 | 0.00 | 1.20 | 0.20 | 1.25 |
| 8 | 0.10 | 0.10 | 1.00 | 0.03 | 0.04 | 1.20 | 0.20 | 1.25 |
| 9 | 0.10 | 0.10 | 1.00 | 0.60 | 0.80 | 1.20 | 0.20 | 1.25 |
| 10 | 0.10 | 0.10 | 1.00 | 1.20 | 1.60 | 1.20 | 0.20 | 1.25 |
| 11 | 0.10 | 0.10 | 1.00 | 1.35 | 1.80 | 1.20 | 0.20 | 1.25 |
| 12 | 0.10 | 0.10 | 0.00 | 0.00 | 0.00 | 1.20 | 0.20 | 1.25 |
| 13 | 0.10 | 0.10 | 0.00 | 0.15 | 0.20 | 1.20 | 0.20 | 1.25 |
| 14 | 0.10 | 0.10 | 0.50 | 0.00 | 0.80 | 1.20 | 0.20 | 1.25 |
| 15 | 0.10 | 0.10 | 0.50 | 0.75 | 1.00 | 1.20 | 0.20 | 1.25 |
| 16 | 0.10 | 0.10 | 2.00 | 2.40 | 3.20 | 1.20 | 0.20 | 1.25 |
| 17 | 0.10 | 0.10 | 2.00 | 2.55 | 3.40 | 1.20 | 0.20 | 1.25 |
| 18 | 0.10 | 0.10 | 3.00 | 3.60 | 4.80 | 1.20 | 0.20 | 1.25 |
| 19 | 0.10 | 0.10 | 3.00 | 3.75 | 5.00 | 1.20 | 0.20 | 1.25 |
| 20 | 0.00 | 0.00 | 1.00 | 0.30 | 0.40 | 1.20 | 0.20 | 1.25 |
| 21 | 0.00 | 0.05 | 1.00 | 0.30 | 0.40 | 1.20 | 0.20 | 1.25 |
| 22 | 0.30 | 0.15 | 1.00 | 0.30 | 0.40 | 1.20 | 0.20 | 1.25 |
| 23 | 0.50 | 0.25 | 1.00 | 0.30 | 0.40 | 1.20 | 0.20 | 1.25 |

<Compositional Ratio of Main Component and Subcomponents and Contents Thereof in Each Dielectric Composition According to an Embodiment of the Present Invention>

TABLE 2

Proto-Type Chip Characteristics

| Samples | Appropriate Sintering Temperature (°C.) | Dielectric Constant | DF (°C.) | RC (WF) | TCC (%) (125° C.) | High Temperature withstand Voltage (V/mm) |
|---|---|---|---|---|---|---|
| 1 | 1160 | 3250 | 6.88 | 5263 | −9.5% | −25.5% | 65 |
| 2 | 1160 | 4045 | 6.55 | 5477 | −8.5% | −23.2% | 70 |
| 3 | 1160 | 4456 | 6.78 | 5102 | −8.0% | −21.6% | 65 |
| 4 | 1160 | 4611 | 7.02 | 5458 | −7.4% | −20.6% | 55 |
| 5 | 1160 | 4732 | 7.45 | 3223 | −7.1% | −19.5% | 50 |
| 6 | 1190 | 4691 | 8.60 | 3040 | −6.5% | −19.1% | 45 |
| 7 | 1160 | 3110 | 6.24 | 7730 | −9.5% | −26.5% | 35 |
| 8 | 1160 | 3450 | 6.22 | 5527 | −9.2% | −27.1% | 45 |
| 9 | 1160 | 4366 | 7.11 | 3512 | −9.6% | −28.5% | 50 |
| 10 | 1160 | 4652 | 7.14 | 2845 | −8.4% | −22.5% | 40 |
| 11 | 1190 | 5124 | 7.88 | 852 | −8.1% | −21.8% | 25 |
| 12 | 1160 | 3050 | 6.25 | 3250 | −5.9% | −19.5% | 50 |
| 13 | 1160 | 4253 | 6.87 | 640 | −7.8% | −22.5% | 10 |
| 14 | 1160 | 4128 | 6.44 | 3356 | −8.8% | −21.1% | 45 |
| 15 | 1160 | 4889 | 7.26 | 566 | −9.1% | −21.1% | 10 |
| 16 | 1160 | 3458 | 5.54 | 2846 | −7.4% | −22.3% | 40 |
| 17 | 1160 | 3556 | 5.60 | 452 | −9.0% | −22.3% | 5 |
| 18 | 1160 | 2789 | 4.51 | 2568 | −8.8% | −26.8% | 35 |
| 19 | 1160 | 2856 | 4.66 | 341 | −9.2% | −27.5% | 5 |
| 20 | 1160 | 4625 | 6.88 | 52 | −8.8% | −23.6% | 5 |
| 21 | 1160 | 4476 | 6.44 | 2102 | −8.2% | −21.1% | 30 |
| 22 | 1160 | 3325 | 5.41 | 2985 | −7.7% | −23.5% | 45 |
| 23 | 1160 | 2458 | 4.22 | 2510 | −7.8% | −20.6% | 35 |

<Characteristics of Proto-Type Chips Made of Dielectric Compositions of Table 1>

Referring to Tables 1 and 2, under the conditions that the total content of the first subcomponent, namely, manganese oxide ($MnO_2$) and vanadium oxide ($V_2O_5$) was fixed to 0.3 at % (manganese oxide 0.1 mole %+vanadium oxide 0.1 mole %); the content of the second subcomponent, magnesium carbonate ($MgCO_3$) was fixed to 1.0 mole %; the total content of the third subcomponent, namely, dysprosium oxide ($Dy_2O_3$) and cerium oxide ($CeO_2$) was fixed to 1.0 at %, as the ratio of the cerium oxide in the third subcomponent was increased (Samples 1 to 6), the dielectric constant increased from 3250 to 4691, and high-temperature withstand voltage exhibited the highest value 70V/μm in Sample 2 (dysprosium oxide ($Dy_2O_3$) 0.4 mole %+cerium oxide ($CeO_2$) 0.2 mole %) and it tended to gradually decrease.

Therefore, it can be seen that when the ratio of cerium oxide in the third subcomponent is controlled within a predetermined range, the dielectric constant is increased while high-temperature withstand voltage characteristics are appropriately maintained.

In order to further confirm an appropriate range of cerium oxide, the total content of dysprosium (Dy) and cerium (Ce) was increased while the ratio of dysprosium (Dy) and cerium (Ce) was maintained at 3:2 (Samples 7 to 11).

Referring to Samples 7 to 11, the dielectric constant continuously increased from 3110 to 5124, and high-temperature withstand voltage exhibited the highest value 50V/μm in Sample 9 (dysprosium oxide 0.6 mole % (dysprosium 1.2 at %)+cerium oxide ($CeO_2$) 1.8 mole %), and after that, it tended to decrease, and rapidly lower in Sample 11 (dysprosium oxide 1.35 mole %+cerium oxide 1.8 mole %).

Therefore, it can be seen that when the total content of dysprosium and cerium in the third subcomponent fell within a specific numerical range, resistance to reduction and reliability was satisfactory, but when it exceeded the specific numerical range, the resistance to reduction and high-temperature withstand voltage characteristics (reliability) were rapidly decreased.

In addition, it can be seen that as the content of the second subcomponent, magnesium carbonate was increased, the resistance to reduction and high-temperature withstand voltage characteristics were rapidly decreased, and thus the content of the third subcomponent was increased.

That is, it can be seen that when the content of magnesium carbonate was 0 mole %, 0.5 mole %, 1.0 mole %, 2.0 mole %, and 3.0 mole % in respectively samples, the content of the third subcomponent was 0.5 at % (Sample 13), 2.5 at % (Sample 15), 4.5 at % (Sample 11), 8.5 at % (Sample 17), and 12.5 at % (Sample 19), and here, the room-temperature RC value and the high-temperature withstand voltage were rapidly decreased.

In addition, it can be seen that when the content of the second subcomponent, magnesium carbonate was in an excess amount of 3.0 mole % (Sample 18), the firing temperature was increased to −26.8° C. and the dielectric constant and the high-temperature withstand voltage were degraded.

In addition, in Samples 20 to 23 the content of the second subcomponent was 1.0 mole %, and the content of the third subcomponent was dysprosium oxide 0.3 mole %+cerium oxide 0.4 mole %.

In Samples 20 to 23, and Sample 16 in which the total content of manganese (Mn)/vanadium (V) was 0 at %, the room-temperature RC value and the high-temperature withstand voltage were very low (in particular Sample 20), and when the total content of the first subcomponent was 1 at % or greater (Sample 23), the dielectric constant and the high-temperature withstand voltage characteristics were degraded.

Therefore, when the amount (at %) of the first subcomponent is designated by x, the amount (at %) of the second subcomponent is designated by y, and the amount (at %) of cerium and other rare-earth elements in the third subcomponent are respectively designated by z and w, based on 100 moles of the base powder, the ranges of x, y, z, and w for realizing desirable dielectric characteristics, resistance to reduction, and reliability in the X5R or X7R type dielectric composition employing $BaTiO_3$ may be $0.01 \leq z \leq x+4y$ and $0.01 \leq z+w \leq x+4y$.

As described above, it may be anticipated that the dielectric constant was increased by about 30% in the case in which the third subcomponent contained a combination of the rare-earth element and cerium (for example, Samples 3 and 4), as compared with the case in which the third subcomponent only contained rare-earth elements other than cerium (for example, Sample 1) while the high-temperature withstand voltage characteristics were maintained at an equal level.

Table 3 below shows the compositional ratio of respective samples in which zirconium (Zr) is added to the X5R or X7R type dielectric composition, and Table 4 shows characteristics of proto-type chips manufactured by the dielectric compositions having the compositional ratios listed in Table 3.

TABLE 3

| | Number of Moles of Each Additive Element Based on 100 Moles of Base Powder $BaTiO_3$ | | | | | | | | |
|---|---|---|---|---|---|---|---|---|---|
| | First Subcomponent | | Second Subcomponent | Third Sub-component | | Fourth Subcomponent | | | Fifth Subcomponent |
| Samples | $MnO_2$ | $V_2O_5$ | $MgCO_3$ | $Dy_2O_3$ | $CeO_2$ | $BaCO_3$ | $Al_2O_3$ | $SiO_2$ | $ZrO_2$ |
| 24 | 0.10 | 0.10 | 1.00 | 0.50 | 0.00 | 1.20 | 0.20 | 1.25 | 0.00 |
| 25 | 0.10 | 0.10 | 1.00 | 0.50 | 0.00 | 1.70 | 0.20 | 1.25 | 0.50 |
| 26 | 0.10 | 0.10 | 1.00 | 0.50 | 0.00 | 2.20 | 0.20 | 1.25 | 1.00 |
| 27 | 0.10 | 0.10 | 1.00 | 0.50 | 0.00 | 3.20 | 0.20 | 1.25 | 2.00 |
| 28 | 0.10 | 0.10 | 1.00 | 0.50 | 0.00 | 4.20 | 0.20 | 1.25 | 3.00 |
| 29 | 0.10 | 0.10 | 1.00 | 0.50 | 0.00 | 7.20 | 0.20 | 1.25 | 6.00 |
| 30 | 0.10 | 0.10 | 1.00 | 0.50 | 0.00 | 11.20 | 0.20 | 1.25 | 10.00 |
| 31 | 0.10 | 0.10 | 0.00 | 0.00 | 0.00 | 1.20 | 0.20 | 1.25 | 0.00 |
| 32 | 0.10 | 0.10 | 0.00 | 0.00 | 0.00 | 3.20 | 0.20 | 1.25 | 2.00 |
| 33 | 0.10 | 0.10 | 0.50 | 0.60 | 0.80 | 1.20 | 0.20 | 1.25 | 0.00 |
| 34 | 0.10 | 0.10 | 0.50 | 0.60 | 0.80 | 3.20 | 0.20 | 1.25 | 2.00 |
| 35 | 0.10 | 0.10 | 2.00 | 2.40 | 3.20 | 1.20 | 0.20 | 1.25 | 0.00 |
| 36 | 0.10 | 0.10 | 2.00 | 2.40 | 3.20 | 3.20 | 0.20 | 1.25 | 2.00 |
| 37 | 0.10 | 0.10 | 3.00 | 3.60 | 4.80 | 1.20 | 0.20 | 1.25 | 0.00 |
| 38 | 0.10 | 0.10 | 3.00 | 3.60 | 4.80 | 3.20 | 0.20 | 1.25 | 2.00 |
| 39 | 0.30 | 0.15 | 1.00 | 0.30 | 0.40 | 1.20 | 0.20 | 1.25 | 0.00 |
| 40 | 0.30 | 0.15 | 1.00 | 0.30 | 0.40 | 3.20 | 0.20 | 1.25 | 2.00 |

<Compositional Ratio of Main Component and Subcomponents and Contents Thereof in Each Dielectric Composition According to an Embodiment of the Present Invention>

TABLE 4

| | Proto-Type Chip Characteristics | | | | | | |
|---|---|---|---|---|---|---|---|
| Samples | Appropriate Sintering Temperature (° C.) | Dielectric Constant | DF (%) | RC (WF) | TCC (%) (85° C.) | TCC (%) (125° C.) | High Temperature withtand Voltage (V/mm) |
| 24 | 1160 | 3550 | 6.88 | 5263 | −9.5% | −25.5% | 65 |
| 25 | 1160 | 3844 | 6.98 | 5002 | −9.8% | −26.1% | 70 |
| 26 | 1160 | 4025 | 7.02 | 5523 | −10.1% | −27.4% | 70 |
| 27 | 1160 | 4486 | 7.25 | 5674 | −10.3% | −27.8% | 70 |
| 28 | 1160 | 4689 | 7.89 | 5123 | −11.2% | −28.5% | 65 |
| 29 | 1160 | 4558 | 7.65 | 5689 | −12.4% | −29.6% | 65 |
| 30 | 1160 | 4512 | 7.23 | 5841 | −14.5% | −33.5% | 60 |
| 31 | 1160 | 3750 | 6.25 | 3250 | −5.9% | −19.5% | 50 |
| 32 | 1160 | 4326 | 7.44 | 3684 | −6.7% | −20.1% | 55 |
| 33 | 1160 | 4128 | 6.44 | 3356 | −8.8% | −21.1% | 45 |
| 34 | 1160 | 4625 | 8.12 | 4001 | −9.5% | −23.4% | 50 |

TABLE 4-continued

Proto-Type Chip Characteristics

| Samples | Appropriate Sintering Temperature (° C.) | Dielectric Constant | DF (%) | RC (WF) | TCC (%) (85° C.) | TCC (%) (125° C.) | High Temperature withtand Voltage (V/mm) |
|---|---|---|---|---|---|---|---|
| 35 | 1190 | 3458 | 5.54 | 2846 | −7.4% | −22.3% | 40 |
| 36 | 1190 | 4953 | 6.84 | 3002 | −8.4% | −23.1% | 40 |
| 37 | 1230 | 2789 | 4.51 | 2568 | −8.8% | −26.8% | 35 |
| 38 | 1230 | 3455 | 5.56 | 2632 | −9.1% | −27.5% | 35 |
| 39 | 1160 | 3325 | 5.41 | 2985 | 7.7% | −23.5% | 45 |
| 40 | 1160 | 3695 | 6.33 | 3122 | −8.1% | −24.4% | 50 |

<Characteristics of Proto-Type Chips Made of Dielectric Compositions of Table 3>

Referring to Tables 3 and 4, under the conditions that the total content of the first subcomponent, namely, manganese oxide ($MnO_2$) and vanadium oxide ($V_2O_5$) was fixed to 0.3 at % (manganese oxide 0.1 mole %+vanadium oxide 0.1 mole %); the content of the second subcomponent, magnesium carbonate ($MgCO_3$) was fixed to 1.0 mole %; the total content of the third subcomponent, namely, dysprosium oxide ($Dy_2O_3$) and cerium oxide ($CeO_2$) was fixed to 1.0 at %, as the ratio of the zirconium oxide in the fifth subcomponent was increased (Samples 24 to 30), the dielectric constant further increased by about 10% or greater as compared with Sample 24 not containing zirconium, while high-temperature withstand voltage characteristics were maintained at an equal level.

It can be seen that as the content of the fifth subcomponent was increased, TCC characteristics were gradually deteriorated, but it can be seen that X5R TCC characteristics were maintained until the content of the fifth subcomponent became 10 at % or less.

Therefore, it can be seen that when the content of the fifth subcomponent is provided within a predetermined range, the dielectric constant is increased while high-temperature withstand voltage characteristics are maintained at a relatively satisfactory level.

It can be seen that in Samples 1 to 23 having excellent withstand voltage characteristics but different compositional ratios, the dielectric constants increase as the fifth subcomponent is added.

As described above, when the dielectric composition is prepared to have a range satisfying these inventive examples, a capacitance level equal to that of a dielectric composition for an existing dielectric layer can be realized even when the dielectric layers are not thinned in order to secure reliability.

Therefore, the embodiments of the present invention can be effectively applied in the development of high-capacitance multilayer ceramic capacitors having thin dielectric layers.

As set forth above, according to embodiments of the present invention, a dielectric composition, capable of realizing an equal level of capacitance to the existing dielectric composition, even while the thickness of dielectric layers is not decreased, and thus securing reliability, and a multilayer ceramic electronic component using the same, can be provided.

While the present invention has been shown and described in connection with the embodiments, it will be apparent to those in the art that modifications and variations can be made without departing from the spirit and scope of the invention as defined by the appended claims.

What is claimed is:

1. A dielectric composition, comprising:
   a base powder including $Ba_mTiO_3$, where $0.995 \leq m \leq 1.010$;
   a first subcomponent including 0.1 to 1.0 at % (x) of an oxide or carbonate containing at least one variable-valence acceptor element based on 100 moles of the base powder;
   a second subcomponent including 0.01 to 3.0 at % (y) of an oxide or carbonate containing at least one fixed valence acceptor element based on 100 moles of the base powder;
   a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$;
   a fourth subcomponent including at least one of an oxide or carbonate containing at least one of barium, calcium, aluminum, and silicon and glass containing silicon; and
   a fifth subcomponent including 0.01 to 10.0 at % of an oxide containing zirconium based on 100 moles of the base powder,
   wherein the variable-valence acceptor element of the first subcomponent is selected from the group consisting of manganese (Mn), vanadium (V), chromium (Cr), iron (Fe), nickel (Ni), cobalt (Co), copper (Cu), and zinc (Zn), and
   the fixed valence acceptor element of the second subcomponent is magnesium (Mg).

2. The dielectric composition of claim 1, wherein the fourth subcomponent is contained in an amount of 0.1 to 8.0 moles based on 100 moles of the base powder.

3. The dielectric composition of claim 1, wherein the rare-earth element of the third subcomponent is selected from the group consisting of yttrium (Y), dysprosium (Dy), holmium (Ho), erbium (Er) and gadolinium (Gd), Nd (Neodynium), Sm (Samarium) and Yb (Ytterbium).

4. The dielectric composition of claim 1, wherein the transition metal of the fourth subcomponent is selected from the group consisting of silicon (Si), barium (Ba), calcium (Ca), and aluminum (Al).

5. A dielectric composition, comprising:
   a base powder including $Ba_mTiO_3$, where $0.995 \leq m \leq 1.010$;
   a first subcomponent including 0.1 to 1.0 at % (x) of an oxide or carbonate containing at least one variable-valence acceptor element based on 100 moles of the base powder;
   a second subcomponent including an oxide or carbonate containing at least one fixed valence acceptor element;
   a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$;

a fourth subcomponent including 0.1 to 8.0 moles of at least one of an oxide or carbonate containing at least one of barium, calcium, aluminum, and silicon and glass containing silicon based on 100 moles of the base powder; and a fifth subcomponent including 0.01 to 10.0 at % of an oxide containing zirconium based on 100 moles of the base powder, wherein the variable-valence acceptor element of the first subcomponent is selected from the group consisting of manganese (Mn), vanadium (V), chromium (Cr), iron (Fe), nickel (Ni), cobalt (Co), copper (Cu), and zinc (Zn), and the fixed valence acceptor element of the second subcomponent is magnesium (Mg).

6. The dielectric composition of claim 5, wherein the second subcomponent is contained in an amount of 0.01 to 3.0 at % based on 100 moles of the base powder.

7. The dielectric composition of claim 5, wherein the rare-earth element of the third subcomponent is selected from the group consisting of yttrium (Y), dysprosium (Dy), holmium (Ho), erbium (Er) and gadolinium (Gd), Nd (Neodynium), Sm (Samarium) and Yb (Ytterbium).

8. The dielectric composition of claim 5, wherein the transition metal of the fourth subcomponent is selected from the group consisting of silicon (Si), barium (Ba), calcium (Ca), and aluminum (Al).

9. A multilayer ceramic electronic component, comprising:
a ceramic sintered body having a plurality of dielectric layers laminated therein;
a plurality of internal electrodes formed within the ceramic sintered body; and
at least one pair of external electrodes provided on external end surfaces of the ceramic sintered body and electrically connected to the internal electrodes,
wherein the dielectric layers include:
a base powder including $Ba_mTiO_3$, where $0.995 \leq m \leq 1.010$;
a first subcomponent including 0.1 to 1.0 at % (x) of an oxide or carbonate containing at least one variable-valence acceptor element based on 100 moles of the base powder;
a second subcomponent including 0.01 to 3.0 at % (y) of an oxide or carbonate containing at least one fixed valence acceptor element based on 100 moles of the base powder;
a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$;
a fourth subcomponent including at least one of an oxide or carbonate containing at least one of barium, calcium, aluminum, and silicon and glass containing silicon; and
a fifth subcomponent including 0.01 to 10.0 at % of an oxide containing zirconium based on 100 moles of the base powder,
wherein the variable-valence acceptor element of the first subcomponent is selected from the group consisting of manganese (Mn), vanadium (V), chromium (Cr), iron (Fe), nickel (Ni), cobalt (Co), copper (Cu), and zinc (Zn), and
the fixed valence acceptor element of the second subcomponent is magnesium (Mg).

10. The multilayer ceramic electronic component of claim 9, wherein the dielectric layers each have a thickness of 0.1 to 10.0 μm.

11. The multilayer ceramic electronic component of claim 9, wherein the internal electrodes include nickel (Ni) or a nickel (Ni) alloy.

12. The multilayer ceramic electronic component of claim 9, wherein the internal electrodes and the dielectric layers are alternately laminated.

13. A multilayer ceramic electronic component, comprising:
a ceramic sintered body having a plurality of dielectric layers laminated therein;
a plurality of internal electrodes formed within the ceramic sintered body; and
at least one pair of external electrodes provided on external end surfaces of the ceramic sintered body and electrically connected to the internal electrodes,
wherein the dielectric layers include:
a base powder including $Ba_mTiO_3$, where $0.995 \leq m \leq 1.010$;
a first subcomponent including 0.1 to 1.0 at % (x) of an oxide or carbonate containing at least one variable-valence acceptor element based on 100 moles of the base powder;
a second subcomponent including an oxide or carbonate containing at least one fixed valence acceptor element;
a third subcomponent including an oxide or carbonate containing cerium (z) at % and at least one other rare-earth element (w) at % based on 100 moles of the base powder, where $0.01 \leq z \leq x+4y$ and $0.01 \leq z+w \leq x+4y$;
a fourth subcomponent including 0.1 to 8.0 moles of at least one of an oxide or carbonate containing at least one of barium, calcium, aluminum, and silicon and glass containing silicon based on 100 moles of the base powder; and
a fifth subcomponent including 0.01 to 10.0 at % of an oxide containing zirconium based on 100 moles of the base powder,
wherein the variable-valence acceptor element of the first subcomponent is selected from the group consisting of manganese (Mn), vanadium (V), chromium (Cr), iron (Fe), nickel (Ni), cobalt (Co), copper (Cu), and zinc (Zn), and
the fixed valence acceptor element of the second subcomponent is magnesium (Mg).

14. The multilayer ceramic electronic component of claim 13, wherein the dielectric layers each have a thickness of 0.1 to 10.0 μm.

15. The multilayer ceramic electronic component of claim 13, wherein the internal electrode include nickel (Ni) or a nickel (Ni) alloy.

16. The multilayer ceramic electronic component of claim 13, wherein the internal electrodes and the dielectric layers are alternately laminated.

* * * * *